US007802262B1

(12) United States Patent
Lynch et al.

(10) Patent No.: US 7,802,262 B1
(45) Date of Patent: Sep. 21, 2010

(54) SYSTEM AND METHOD FOR COMMUNICATING STATE AND TITLE INFORMATION BETWEEN A BROWSER AND A RICH INTERNET APPLICATION WITH BROWSER FORWARD AND BACK BUTTON SUPPORT

(75) Inventors: Kevin Lynch, San Francisco, CA (US); Glenn Ruehle, Novato, CA (US); Manish Jethani, Mumbai (IN)

(73) Assignee: Adobe Systems Incorporated, San Jose, CA (US)

( * ) Notice: Subject to any disclaimer, the term of this patent is extended or adjusted under 35 U.S.C. 154(b) by 978 days.

(21) Appl. No.: 11/280,023

(22) Filed: Nov. 15, 2005

Related U.S. Application Data

(63) Continuation-in-part of application No. 10/794,173, filed on Mar. 5, 2004, now Pat. No. 7,536,672.

(60) Provisional application No. 60/736,978, filed on Nov. 14, 2005.

(51) Int. Cl.
*G06F 13/00* (2006.01)
(52) U.S. Cl. .................. 719/313; 719/329; 709/217
(58) Field of Classification Search .................. 719/313, 719/329; 709/217
See application file for complete search history.

(56) References Cited

U.S. PATENT DOCUMENTS

| 5,157,763 | A | 10/1992 | Peters et al. |
| 5,301,268 | A | 4/1994 | Takeda |
| 5,555,416 | A | 9/1996 | Owens et al. |
| 5,606,674 | A | 2/1997 | Root |
| 5,625,809 | A | 4/1997 | Dysart et al. |
| 5,694,563 | A | 12/1997 | Belfiore et al. |
| 5,781,192 | A | 7/1998 | Kodimer |
| 5,784,058 | A | 7/1998 | LaStrange et al. |
| 5,801,693 | A | 9/1998 | Bailey |
| 5,835,777 | A | 11/1998 | Staelin |
| 5,886,699 | A | 3/1999 | Belfiore et al. |
| 5,924,099 | A | 7/1999 | Guzak et al. |
| 5,999,740 | A | 12/1999 | Rowley |
| 6,009,274 | A | 12/1999 | Fletcher et al. |
| 6,028,965 | A | 2/2000 | Normile |
| 6,061,058 | A | 5/2000 | Owens et al. |

(Continued)

FOREIGN PATENT DOCUMENTS

WO     WO 00/43913     7/2000

(Continued)

OTHER PUBLICATIONS

Corporate Portals Letter, vol. 1, No. 10, Oct. 2000.

(Continued)

*Primary Examiner*—Andy Ho
(74) *Attorney, Agent, or Firm*—Fish & Richardson P.C.

(57) ABSTRACT

A system and method communicates address and state information from a browser to a rich Internet application to allow the Rich Internet Application to start at a location, or preload variables, corresponding to the state information. The system and method communicates address and state information from the Rich Internet Application to the browser to allow such information to be displayed by the browser for use or retrieval. The system and method allows the user to navigate within the Rich Internet Application using the browser's forward and back buttons.

30 Claims, 6 Drawing Sheets

U.S. PATENT DOCUMENTS

| | | | |
|---|---|---|---|
| 6,067,582 A | 5/2000 | Smith et al. | |
| 6,125,388 A | 9/2000 | Reisman | |
| 6,216,152 B1 | 4/2001 | Wong et al. | |
| 6,272,493 B1 | 8/2001 | Pasquali | |
| 6,314,565 B1 | 11/2001 | Kenner et al. | |
| 6,321,209 B1 | 11/2001 | Pasquali | |
| 6,378,128 B1 | 4/2002 | Edelstein et al. | |
| 6,418,555 B2 | 7/2002 | Mohammed | |
| 6,434,563 B1 | 8/2002 | Pasquali et al. | |
| 6,527,812 B1 | 3/2003 | Bradstreet | |
| 6,532,472 B1 | 3/2003 | Arrouye et al. | |
| 6,535,882 B2 | 3/2003 | Pasquali | |
| 6,557,054 B2 | 4/2003 | Reisman | |
| 6,606,744 B1 | 8/2003 | Mikurak | |
| 6,636,856 B2 | 10/2003 | Pasquali | |
| 6,654,765 B2 | 11/2003 | Wong et al. | |
| 6,658,419 B2 | 12/2003 | Pasquali | |
| 6,687,745 B1 | 2/2004 | Franco et al. | |
| 6,757,365 B1 | 6/2004 | Bogard | |
| 6,785,885 B2 | 8/2004 | Norris et al. | |
| 6,803,929 B2 | 10/2004 | Hinegardner et al. | |
| 6,839,714 B2 | 1/2005 | Wheeler et al. | |
| 6,904,569 B1 | 6/2005 | Anderson | |
| 6,944,821 B1 | 9/2005 | Bates et al. | |
| 6,961,907 B1 | 11/2005 | Bailey | |
| 7,080,139 B1 | 7/2006 | Briggs et al. | |
| 7,085,817 B1 | 8/2006 | Tock et al. | |
| 7,089,563 B2 * | 8/2006 | Nagel et al. | 719/313 |
| 7,120,914 B1 * | 10/2006 | Manthos et al. | 718/108 |
| 7,127,405 B1 | 10/2006 | Frank et al. | |
| 7,143,392 B2 | 11/2006 | Li et al. | |
| 7,143,393 B1 | 11/2006 | Ezra et al. | |
| 7,263,545 B2 | 8/2007 | Digate et al. | |
| 7,287,097 B1 | 10/2007 | Friend et al. | |
| 7,293,242 B2 | 11/2007 | Cossey | |
| 7,296,244 B2 | 11/2007 | Martinez et al. | |
| 7,299,259 B2 | 11/2007 | Petrovykh | |
| 7,305,453 B2 | 12/2007 | Awamoto et al. | |
| 7,310,781 B2 | 12/2007 | Chen et al. | |
| 7,337,210 B2 | 2/2008 | Barsness | |
| 7,370,278 B2 | 5/2008 | Malik | |
| 7,383,308 B1 | 6/2008 | Groves et al. | |
| 7,383,356 B2 | 6/2008 | Gargi | |
| 7,395,500 B2 | 7/2008 | Whittle et al. | |
| 7,434,048 B1 | 10/2008 | Shapiro et al. | |
| 7,451,218 B2 | 11/2008 | Malik et al. | |
| 7,478,336 B2 | 1/2009 | Chen et al. | |
| 7,536,672 B1 | 5/2009 | Ruehle | |
| 7,617,458 B1 | 11/2009 | Wassom et al. | |
| 2001/0034244 A1 | 10/2001 | Calder et al. | |
| 2002/0049633 A1 | 4/2002 | Pasquali | |
| 2002/0055975 A1 | 5/2002 | Petrovykh | |
| 2002/0069264 A1 | 6/2002 | Pasquali | |
| 2002/0080179 A1 | 6/2002 | Okabe et al. | |
| 2002/0103902 A1 | 8/2002 | Nagel et al. | |
| 2002/0143861 A1 | 10/2002 | Greene et al. | |
| 2003/0050932 A1 | 3/2003 | Pace et al. | |
| 2003/0208491 A1 | 11/2003 | Pasquali | |
| 2004/0093563 A1 | 5/2004 | Pasquali | |
| 2004/0111478 A1 | 6/2004 | Gross et al. | |
| 2004/0143633 A1 | 7/2004 | McCarty | |
| 2004/0205134 A1 | 10/2004 | Teven et al. | |
| 2005/0021652 A1 | 1/2005 | McCormack | |
| 2005/0049960 A1 | 3/2005 | Yeager | |
| 2005/0086290 A1 | 4/2005 | Joyce et al. | |
| 2005/0086640 A1 | 4/2005 | Kolehmainen et al. | |
| 2005/0097061 A1 | 5/2005 | Shapiro et al. | |
| 2005/0172241 A1 | 8/2005 | Daniels et al. | |
| 2005/0198581 A1 | 9/2005 | Soderberg et al. | |
| 2005/0203892 A1 | 9/2005 | Wesley et al. | |
| 2005/0210401 A1 | 9/2005 | Ketola et al. | |
| 2005/0257128 A1 | 11/2005 | Pasquali et al. | |
| 2005/0262521 A1 | 11/2005 | Kesavarapu | |
| 2006/0025091 A1 | 2/2006 | Buford | |
| 2006/0085796 A1 | 4/2006 | Hoerle et al. | |
| 2006/0095524 A1 | 5/2006 | Kay et al. | |
| 2006/0271526 A1 | 11/2006 | Charnock et al. | |
| 2009/0228805 A1 | 9/2009 | Ruehle | |

FOREIGN PATENT DOCUMENTS

| | | |
|---|---|---|
| WO | WO 00/49545 | 8/2000 |

OTHER PUBLICATIONS

Focus on HP OpenView, Nathan J. Muller, Mar. 1995, Chapters 8, 9, 10.

RealPresenter Plug-in, User's Guide Version 5.0, Real NetworksInc., 1998, 29 pages.

Netscape 7.1 Upgrade Guide, 8 pages, 2003.

Lambert, Karine, Authorized Officer, European Patent Office, International Search Report, Application No. PCT/US2008/066184, mailed Nov. 6, 2008, 15 pages.

Lambert, Karine, Authorized Officer, European Patent Office, International Search Report, Application No. PCT/US2008/066188, mailed Nov. 6, 2008, 15 pages.

Sun Microsystems, Inc., Java™ Network Launching Protocol & API Specification (JSR-56) Version 1.5 [Online] May 2001, XP007906066. Retrieved from the Internet: (Retrieved on Nov. 24, 2008), pp. 1-85.

Sun Microsystems, Inc., "Auto Downloading JREs using Java™ Web Start and Java™ Plug-in" [Online] Feb. 2007, pp. 1-3, XP007906067. Retrieved from the Internet: (Retrieved on Nov. 28, 2004).

Sun Microsystems, Inc., Packaging JNLP Applications in a Web Archive, Java™ Web Start 1.4.2 [Online] Aug. 2005, pp. 1-11, XP007906068. Retrieved from the Internet: (Retrieved on Nov. 28, 2004).

Phillip J. Windley, "REST: Representational State Transfer," Chapter 11, Mar. 22, 2005, pp. 237-261.

Office Action, U.S. Appl. No. 11/090,402 mailed Nov. 19, 2007, 9 pages.

Final Office Action, U.S. Appl. No. 11/090,402 mailed Jul. 22, 2008, 18 pages.

Office Action, U.S. Appl. No. 11/090,402 mailed Jan. 9, 2009, 18 pages.

Office Action, U.S. Appl. No. 11/089,699 mailed Jun. 25, 2008, 122 pages.

Office Action, U.S. Appl. No. 11/089,699 mailed Dec. 15, 2008, 8 pages.

Office Action, U.S. Appl. No. 11/089,699 mailed Jul. 9, 2009, 10 pages.

Office Action, U.S. Appl. No. 11/090,741 mailed Aug. 28, 2008, 26 pages.

Final Office Action, U.S. Appl. No. 11/090,741 mailed Mar. 6, 2009, 40 pages.

Office Action, U.S. Appl. No. 11/280,714 mailed Jun. 11, 2009, 27 pages.

Office Action, U.S. Appl. No. 11/282,916 mailed Jan. 28, 2009, 15 pages.

Final Office Action, U.S. Appl. No. 11/282,916 mailed Jul. 9, 2009, 26 pages.

Office Action, U.S. Appl. No. 11/282,217 mailed Feb. 5, 2009, 16 pages.

Kolehmainen et al., U.S. Provisional Application No. 60/513,050, titled: Systems and Methods for Facilitating Software Development and Communications Efficacy, filed Oct. 21, 2003, to be published by the USPTO, 39 pages.

Chen, Qing, Examiner, in U.S. Appl. No. 11/282,916, filed Nov. 18, 2005, Office Action dated Jul. 9, 2009, to be published by the USPTO, 26 pages.

Ghaeedan, Massoud, Examiner, in U.S. Appl. No. 11/282,217, filed Nov. 18, 2005, Office Action dated Aug. 5, 2009, to be published by the USPTO, 19 pages.

Bodden, Evral E., Examiner, in U.S. Appl. No. 11/090,741, Non-Final Office Action dated Jan. 7, 2010, to be published by United States Patent and Trademark Office, 51 pages.

Ghaeedan, Massoud, Examiner, in U.S. Appl. No. 11/282,217, Non-Final Office Action dated Jan. 4, 2010, to be published by United States Patent and Trademark Office, 20 pages.

Hope, Darrin, Examiner, in U.S. Appl. No. 11/090,402, Non-Final Office Action dated Aug. 6, 2009, to be published by United States Patent and Trademark Office, 24 pages.

Nguyen, Chau T., Examiner, in U.S. Appl. No. 11/280,714, Final Office Action dated Dec. 24, 2009, to be published by United States Patent and Trademark Office, 34 pages.

Ruehle, Glenn Warren, "Management of User Interaction History With Software Applications", U.S. Appl. No. 10/794,173, filed Mar. 5, 2004, now Patent No. 7,536,672, published by the USPTO, 25 pages.

Chauhan, Loren B., Patent Examiner, U.S. Patent Office, U.S. Appl. No. 10/794,173, filed Mar. 5, 2004, in Office Action mailed Aug. 20, 2008, published by the USPTO, 14 pages.

Chauhan, Loren B., Patent Examiner, U.S. Patent Office, U.S. Appl. No. 10/794,173, filed Mar. 5, 2004, in Notice of Allowance mailed Jan. 9, 2009, published by the USPTO, 10 pages.

Chauhan, Loren B., Patent Examiner, U.S. Patent Office, U.S. Appl. No. 10/794,173, filed Mar. 5, 2004, in Office Action mailed Nov. 16, 2007, published by the USPTO, 12 pages.

Chauhan, Loren B., Patent Examiner, U.S. Patent Office, U.S. Appl. No. 10/794,173, filed Mar. 5, 2004, in Office Action mailed May 23, 2008, published by the USPTO, 14 pages.

* cited by examiner

SYSTEM AND METHOD FOR COMMUNICATING STATE AND TITLE INFORMATION BETWEEN A BROWSER AND A RICH INTERNET APPLICATION WITH BROWSER FORWARD AND BACK BUTTON SUPPORT

RELATED APPLICATIONS

This application claims the benefit of U.S. provisional patent application Ser. No. 60/736,978, entitled "Method and Apparatus for Communicating State and Title Information Between a Browser and a Rich Internet Application", filed on Nov. 14, 2005 by Kevin Lynch, having the same assignee as the present application, and is a continuation in part of U.S. patent application Ser. No. 10/794,173, entitled, "Management of User Interaction History with Software Applications" filed on Mar. 5, 2004, by Glenn W. Ruehle having the same assignee as the present application and each is hereby incorporated by reference in its entirety.

FIELD OF THE INVENTION

The present invention is related to computer software and more specifically to computer software for the Internet.

BACKGROUND OF THE INVENTION

Many internet addresses employ representational state transfer information (known as "REST information") to specify the contents of a web page. The REST information is used by the server to retrieve and provide the web page. For example, selecting a book at the Web Site of Amazon.com takes you to a link: amazon.com/exec/obidos/tg/detail/-/0321213432/qid=1107977455/sr=1-8/ref=sr_1_8/104-2847832-6485547?v=glance&s=books. Everything after the domain name may be REST information (the http://www has been omitted from the link above).

REST information is not only useful to the server: it can also be useful for the user. A browser will record the entire link, including the REST information, to allow a user to use the back button on a browser and get back to a prior-viewed page, or a user can bookmark the link. The user can also cut the link from the browser's address box, and provide it in an e-mail message, for example. In either case, the link can be used to navigate directly to the page desired, bypassing the site navigation tools that would otherwise be required to get there if one had only the domain name.

The representational state transfer information may contain information that can be useful for other purposes. For example, John Udell's Library Lookup Bookmarklets scrapes the ISBN from the REST information used in popular book retailer's web sites to show a user whether one or more specified libraries carries the book being viewed on the retailer's web site.

Another form of information that the user of a web page can use is a title of a web page. The title of a web page is displayed in certain locations, notably across the title bar of the browser window. If the title describes the information in the web page being displayed, the user can use the title to identify the information contained in the web page being displayed. The title may also be captured with a bookmark and used as the title of the bookmark, simplifying the bookmarking process. Additionally, the title can be used as the title of the window, and the title may be displayed in a status area of the operating system, indicating all windows active, to assist the user in selecting among the various windows.

The REST information and the title can change as described above for every web page displayed. This allows the exact location of a web page to be freely available, and the title information to remain current. However, when the information being displayed in a browser contains a Rich Internet Application (known as "RIA"), such as a Flash movie, the title and REST information will not change from the web page used to download the RIA. Thus, the title can become out of sync with the content of the RIA and the REST information only indicates the web page used to navigate to the start of the RIA. This REST information cannot be used to mark a specific point in the RIA for the purposes described above or be used to directly navigate to a point past the starting point of the RIA.

Some web sites have read in REST information in the URI that was either entered by a user or part of a link, to allow a user to jump to a specific web page, but such information was never updated in the address box of the browser as the RIA progressed.

Users also find it helpful to use a browser's "forward" and "back" buttons to move to web pages they have visited before. However, because an RIA may appear as a single web page to the browser, the user is unable to use the browser's forward and back buttons to navigate within an RIA.

What is needed is a system and method that can allow the browser to display REST information that corresponds to various points in a RIA, can utilize the RIA information provided to navigate to a point in the RIA after the start of the RIA and can update the browser title to correspond to the information being displayed in the RIA, and can allow the user to revisit various points in the RIA the user has already visited using the browser's forward and back buttons.

SUMMARY OF INVENTION

A system and method allows REST information to be retrieved from the address box of the browser and used by a rich Internet application ("RIA") to navigate to the point to which the REST or other information corresponds, preload variables, or both. As the RIA operates, at various points in the RIA, the system and method inserts an address and REST information into the address box of a browser, and/or a title to the title bar of the browser, to identify the state of the Rich Internet Application at each of those points. The user can capture the address and REST information from the address box to refer to the identified point at a later time.

To implement the operations described above, in one embodiment, the system and method adds a visual basic script and certain JavaScript functions, described below, to the web page that references the RIA (the "referring page"). One of the JavaScript functions identifies the type of the browser, for example, whether the browser is Internet Explorer or another type of browser, and provides the initial address and REST information used to load the page to the RIA via an HTML object and embed tag. The RIA can then parse the REST information in the information it receives and determine how to start in a manner that corresponds to the REST information. If no REST information is received, the RIA can start at a usual beginning point.

As the RIA operates, it can provide to the browser an address and REST information and title information that corresponds to the approximate location of the program as certain reference points in the program are reached or as other events occur. This may be accomplished for non-IE browsers by the RIA communicating to JavaScript functions in the referring web page that then provide this information to the browser. For Flash-based RIAs, communication with JavaScript is accomplished using the getURL instruction in Flash Actionscript. The RIA communicates with IE using VBScript functions in the referring web page that then provide the address and REST information and the title to the Browser. For Flash-based RIAs, communication with VBScript is accomplished using the fscommand in Flash Actionscript. The name of the VBScript function on the referring page will start with same name as the Flash application's ID used in the Object tag (e.g. "flashapp"). Other characters can finish the name of the VBScript function.

To allow the user to navigate the RIA using the browser's' forward and back buttons, the referring page may contain a conventional iframe, which designates a frame that will not be displayed. Each time the regular RIA provides additional REST information as described above, it directs the browser to reload the iframe, using a URL that references a utility referring page, and also includes the same REST information that was provided to the browser for display in the address bar as described above. The browser will load or reload the utility referring page into the iframe. The utility referring page directs the browser to instantiate a utility application and make available to the utility application the address and REST information from the URL provided by the RIA. The utility application retrieves the address and REST information and provides the REST information it receives to the RIA. The RIA receives the REST information and determines the time elapsed since it provided the instruction to the browser to load or reload the iframe. If the amount of time is below a threshold, the RIA will ignore the REST information it receives, and otherwise, it will jump to the location, preload variables, or both, as indicated by the REST information. As a result, when the RIA directs the browser to reload the iframe, the REST information the RIA receives from the utility application will have no effect. However, each time the browser loads or reloads the iframe, the browser will record the address and REST information in its history, enabling the use of the forward and back buttons of the browser. If the user uses one of those buttons, the browser will reload the iframe with the REST information that is stored in the browser's history. The utility application will be reinstantiated and will again provide the REST information to the RIA. The RIA will determine the amount of time elapsed since the browser was instructed to load or reload the iframe. Because this amount of time will typically exceed the threshold, the RIA will jump to the location, preload variables or both, as indicated by the REST information it receives, and continue operating from that point. In another embodiment, the RIA will jump to the location, preload variables or both in response to the state information received from the utility application being different from the state information it provided to the browser to load or reload the iframe instead of the time exceeding the threshold. In either case, the forward and back buttons of the browser will navigate the RIA among the locations corresponding to the new REST information provided by the RIA that the user has previously visited.

DETAILED DESCRIPTION OF A PREFERRED EMBODIMENT

Figure 1:
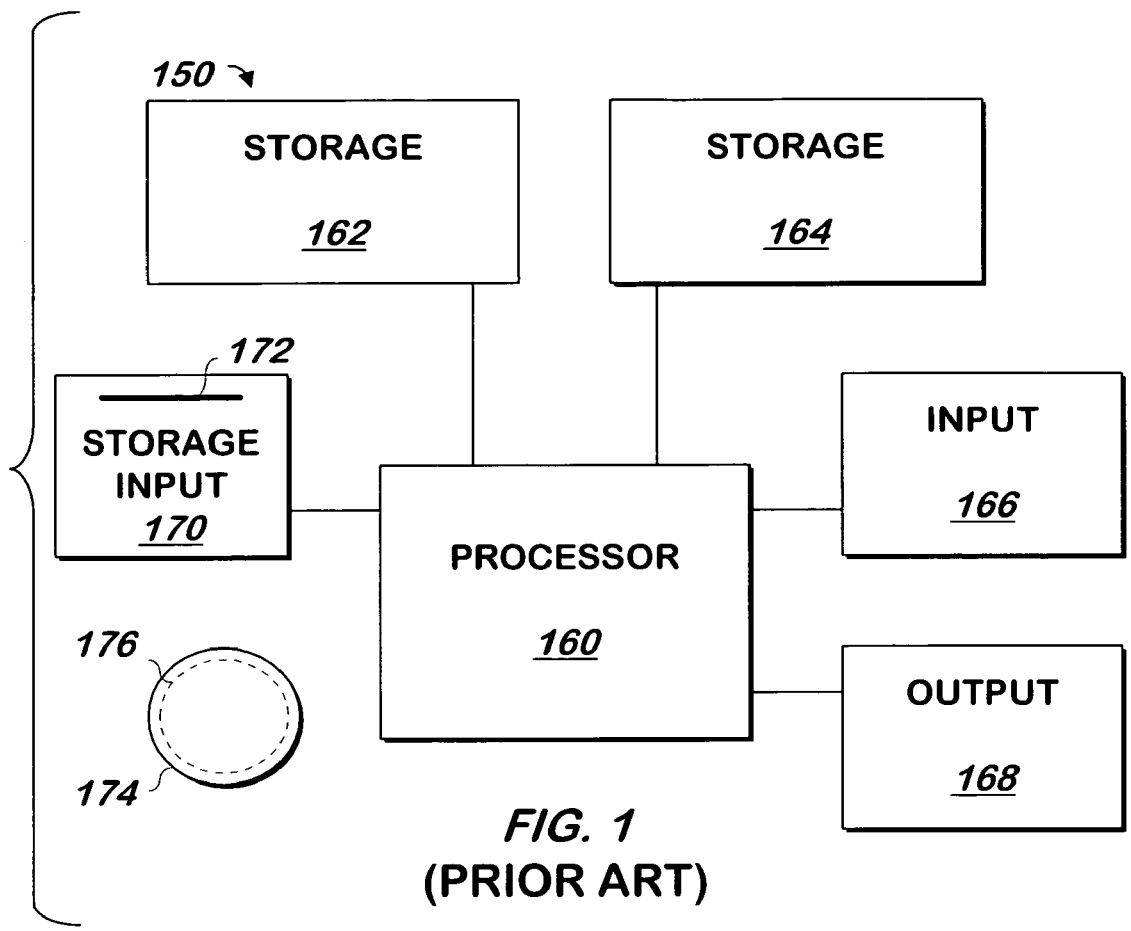
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encoding in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Browser Loads Referring Page

Figure 2A:
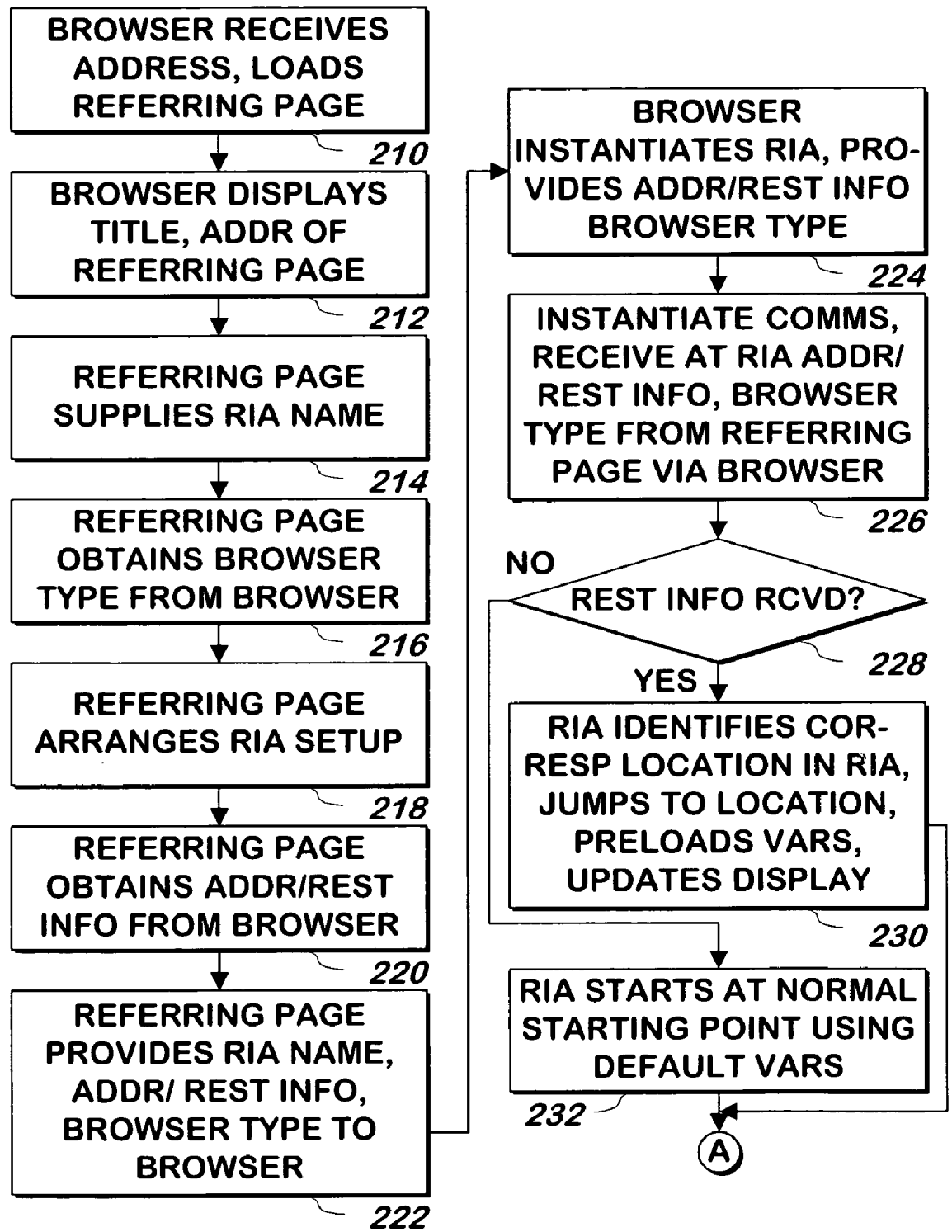
FIG. 2, consisting of FIGS. 2A and 2B, is a flowchart illustrating a method of communicating REST information and title information between a browser and an RIA according to one embodiment of the present invention.
Figure 2B:
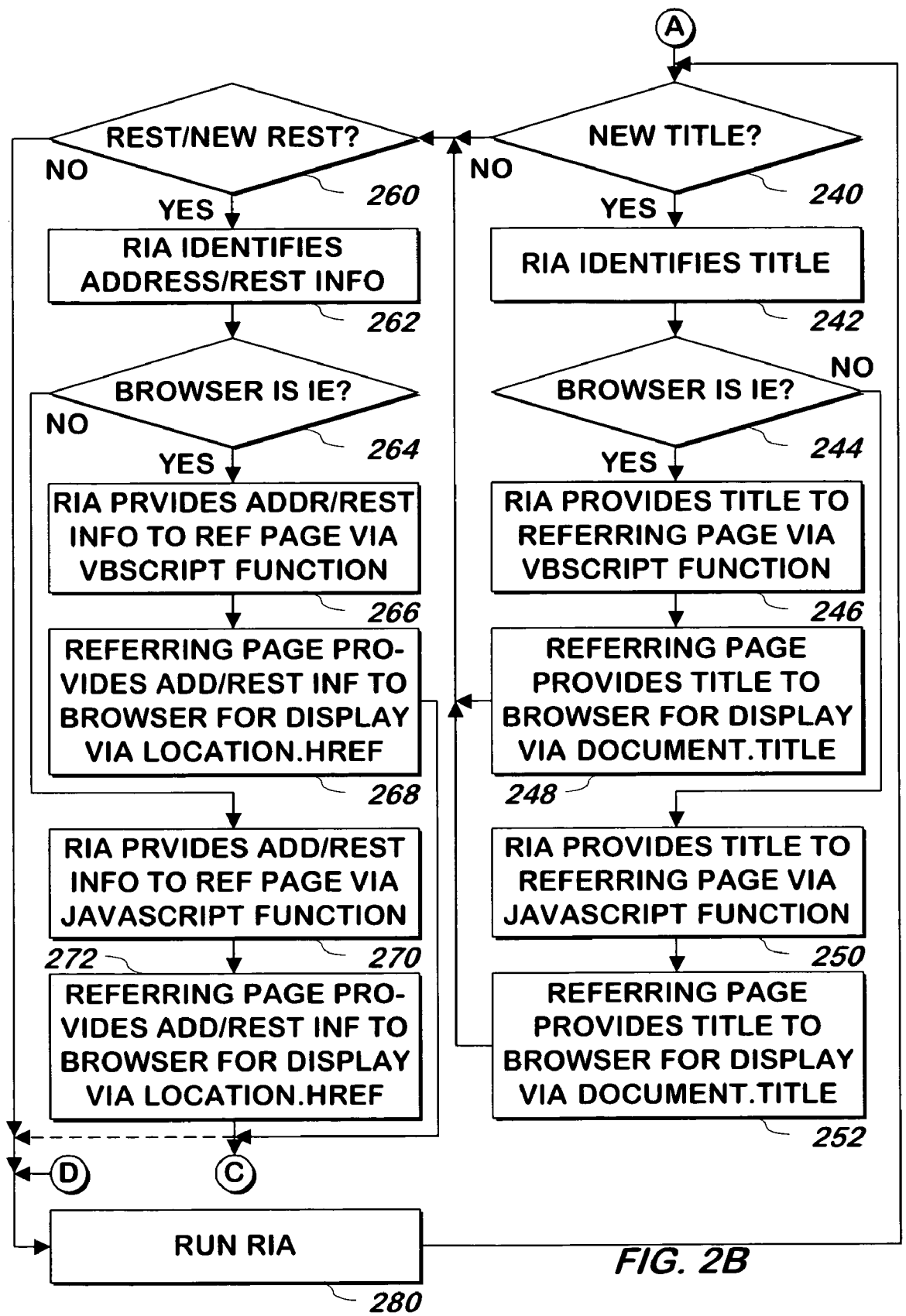

FIG. 2 illustrates a method of communicating REST information and title information between an RIA, such as a Flash application or other interactive application that is downloaded via a network, such as the Internet, and the user's browser. Referring now to FIG. 2, when a user wishes to access a web page that refers to a Rich Internet Application, or RIA, the user enters the address of the referring page, and optional REST information, into the address box of a conventional browser, such as Internet Explorer, commercially available from Microsoft Corporation of Redmond, Wash., or a Mozilla-based browser, such as the conventional Firefox browser, commercially available at the web site Firefox.com. The browser receives the address and REST information and loads the referring page corresponding to the address 210. In one embodiment, the referring page contains a reference to, or the code for, a Rich Internet Application, or RIA, such as a Flash application.

In one embodiment, an author adds the following code to the referring page (the web page that refers to the RIA), the operation of which is described in more detail further below:

function showFlash(swf, w, h) (instruction 1)

{ var isMSIE=navigator.appName.indexOf ("Microsoft") !=−1;d (instr 2)

var l1='<object classid="clsid:

D27CDB6E-AE6D-11cf-96B8-444553540000"

codebase="http://fpdownload.macromedia.com/ pub/shockwave/cabs/flash/ swflash.cab#version=7,0,0,0"

width="'+w+'" height="'+h+'" id="flashapp"

align=" ">'(instr 3)

var l2='<param name="movie"

value="'+swf+'"/>'(instr 4)

var l3='<param name="menu"

value="false"/>'(instr 5)

var l4='<param name="quality"

value="best"/>'(instr 6)

var l5='<param name="FlashVars"

value="initialURL='+document.location+

'&is MSIE='+isMSIE+'"/>' (instr 7)

var l6='<embed src="'+swf+'"

FlashVars="initialURL='+document.location+

'&isMSIE='+isMSIE+'" menu="false" quality="best"

width="'+w+'" height="'+h+'"

name="flashapp" align=" "

type="application/x-shockwave-flash"

pluginspage="http://www.macromedia.com/ go/getflashplayer "></embed></object>' (instr 8)

document.write(l1+l2+l3+l4+l5+l6); (instr 9)

}

-->

</script>

<script language="JavaScript"> showFlash("example.swf", 500, 400); (instr 10)

</script>

In one embodiment, the REST information that may be received with the address may contain location references, variable information, or both. The browser displays the title of the referring page in the title bar of the browser and displays the address of the referring page in the address bar of the browser.

Supply RIA Name

The name of an RIA is supplied 214 by the referring page in instruction 10 of the code above, and the function "showFlash" is called with the name of an RIA, as shown below:

showFlash ("example.swf", 500, 400);

In this example, the Flash Application "example.swf" is supplied 214, as the RIA name by the referring page.

Obtain Browser Type

The browser type is obtained 216 from the browser by the referring page. In one embodiment, the function "navigator.appName.indexOf" is used by the referring page with an argument of "Microsoft," as shown above in instruction 2, and the value, true or false, is stored in the variable "isMSIE". In the above example, if the function returns any response other than −1, then the referring page obtains 216 Internet Explorer as the browser type, and "isMSIE" is set to true; otherwise, "isMSIE" is set to false.

Arrange RIA Setup

The setup of the RIA is arranged 218 by the referring page. To arrange such setup, in one embodiment, the referring page constructs strings, which can be later carried out as commands, that assign values to parameters used by the browser to instantiate the RIA. For example, in line 7 above, the string "var l1" is a command, stored at this point as a string, to set the values of the variables "object classid", "codebase", "width", "height", "id" and "align" to the values shown above in instruction 3. In the above example, instructions 4 through 8 are similarly used to arrange the setup of an RIA that runs under the Flash player commercially available from Macromedia Inc. of San Francisco, Calif. at the web site macromedia.com.

Obtain Address and REST Information

The address and REST information is obtained 220 by the referring page from the browser. In one embodiment, the referring page obtains the address and REST information from the browser using "document.location", as shown in instructions 7 and 8 above, which retrieves any REST information supplied with the address used to load the referring page.

Provides RIA Name, Address, REST Info, Browser Type to Browser

The name of the RIA, the address and REST information and the browser type are provided 222 by the referring page to the browser. In one embodiment, the referring page uses the various strings it has arranged in step 218 with the "document.write" in instruction 9 to provide the browser with the RIA name, address and REST information and browser type. The example above uses "document.write" with the argument "l1+l2+l3+l4+l5+l6", which strings together variables l1 through l6, all of which are commands arranged by the referring page as described above. For example, instruction 7 of the code above shows "var l5," which is part of the argument used by the referring page with "document.write," to be a string which commands the browser to set FlashVars "initialURL" to the address and REST information of the page referring to the Flash application, and to set "isMSIE" to be true if the browser is Microsoft Internet Explorer. FlashVars are used to pass parameters to a Flash RIA and are described in more detail at the web page macromedia.com/cfusion/knowledgebase/index.cfm?id=tn_16417. When "document.write" executes, "var l5" will execute as a command, providing the REST information supplied with the address of the referring page and the browser type to the browser, which will make them available to the browser. Using "var 15," with "document.write," along with variables 11, 12, 13, 14 and 16, the RIA name, address and REST information and browser type are provided to the browser by the referring page, and the browser is commanded to instantiate the RIA and Flash.

Instantiate RIA, Provide REST Info and Browser Type

At step 224, the RIA is instantiated by the browser, and the address and REST information and browser type are provided, or otherwise made available, to the RIA by the browser as well. In one embodiment, as noted above, the Flash application and Flash are instantiated by the browser as a result of the document.write in instruction 9. The REST information and browser type are obtained from the browser by a Flash application, having been made available via the "FlashVars" parameter, set up as shown in instruction 7. As an example, "initialURL", which is set to the whole URL of the page referring to the Flash application, including any REST information, and "isMSIE", which is set to true if the browser is Microsoft Internet Explorer, are provided, or otherwise made available, to the RIA, as arranged in instructions 7 and 8.

Instantiate Communications to Receive Rest Info and Browser Type at RIA

At step 226, the communication capability between the RIA and the browser is optionally instantiated, and the REST information and browser type are received at the RIA. In one embodiment, to instantiate communications, a Flash RIA imports a BrowserStateManager class using "import BrowserStateManager", and then creates a new instance of it, using "var browserstate=new BrowserStateManager( );". The BrowserStateManager class is available at the web site klynch.com/apps/flashlinking/flashlinking.zip.

Start RIA at Normal Starting Point

If REST information has not been received 228 at the RIA, then the RIA starts operating 232 at the default starting point, for example the beginning of a movie. In one embodiment, to determine whether REST information has been received, the RIA parses the URL it receives for any REST information that corresponds to starting point information. The RIA may also parse the URL for initial variable information. Variables used by the program are initialized to their default values if no REST information corresponding to the variable information is present.

Start RIA According to Rest Information

If REST information has been received at the RIA 228, then the RIA starts operating at the location in the RIA corresponding to the REST information, preloads certain variables, or both 230. The method continues at step 240 of FIG. 2B.

RIA Identifies New Title

In step 240, the RIA determines whether a new title should be displayed by the browser, and if so, it identifies 242 the new title for the browser to display. In one embodiment, if no new title is to be displayed 240, then the method continues at 260. In one embodiment, the RIA determines 244 whether the browser is Microsoft Internet Explorer or a non-Microsoft Internet Explorer browser, such as Firefox, a Mozilla-based internet browser. In one embodiment, this determination is made based on the value of the "isMSIE" Flashvar received or retrieved by the RIA as part of step 226.

RIA Provides Title to Ref. Page Via VBScript Function

If the browser is Microsoft IE 244, then the RIA provides 246 the new title to the referring page by calling a VBScript function, and passing the title as a parameter to this function. In one embodiment, an FSCommand Flash ActionScript instruction is used to provide the new title to the VBScript function added to the referring page by the author of the referring page. In one embodiment, the function is added as follows:

<script language="VBScript">

<!--

Sub flashapp_FSCommand(ByVal command, ByVal args)

select case command case "putHREF" location.href=args case "putTitle" document.title=args end select end sub -->

</script>

Fscommand is described at the web page, macromedia.com/support/flash/action_scripts/actionscript_dictionary/actionscript_dictionary372.html The name of the VBScript function on the referring page starts with same name as the Flash application's ID used in the Object tag (e.g. "flashapp"). Other characters can finish the name of the VBScript function.

Ref. Page Provides Title to Browser for Display

In step 248, the new title is provided to the browser by a VBScript function by the referring page, and the title display on the browser is updated accordingly. In one embodiment, the title information is provided 248 by the VBScript function on the referring page by setting the value of "document.title", and the window title of the browser is updated by the browser in response. The method continues at step 260.

RIA Provides Title Info to Ref. Page Via Javascript

If the browser is not Microsoft Internet Explorer 244, then the RIA provides 250 the title information to the referring page using a JavaScript function. In one embodiment, the title information can be provided by the Flash RIA to a JavaScript function on the referring page by calling the getURL( ) function in ActionScript and using the "javascript" prefix to indicate that there is an external JavaScript to be run. In one embodiment, receiving JavaScript functions are defined in the referring page as <script language="JavaScript">

<!-- function flashPutHref(href) {location.href=href;} function flashPutTitle(title) {document.title=title;}

-->

</script>

The getURL( ) function is described at the Web page macromedia.com/support/flash/action_scripts/actionscript_dictionary/actionscript_dictionary377.html Referring Page Provides Title to Browser for Display The referring page provides the title information to the browser, which updates the display, using "document.title" 252. In the JavaScript functions above, function flashPutTitle(title) {document.title=title;} assigns a new value to "document.title", updating the window title 252.

RIA Identifies REST Info

If the RIA determines that the address and new REST information should be displayed 260 by the browser, it identifies 262 the new REST information to be displayed, and the method continues at step 264. In one embodiment, the address is the same address received by the RIA as described above. In one embodiment, if no new REST information is to be displayed 260, then the method continues at step 280. At step 264, the RIA determines 264 whether the browser is Microsoft Internet Explorer or a non-Microsoft Internet Explorer browser, such as Firefox, a Mozilla-based internet browser, as described above.

RIA Provides REST Info to Ref. Page Via VBScript

In a manner similar to the way the title is provided to Internet Explorer, as described above, if the browser is Microsoft IE 264, then the RIA provides 266 the REST information to the referring page using a VBScript function. The address may be the one received by the RIA as described above. In one embodiment, FSCommand Flash ActionScript is used, as shown above, to provide 266 the address and REST information to the referring page. In one embodiment, the REST information is provided to the referring page using a Flash ActionScript FSCommand function as follows:

Fscommand("putHREF", "#"+this.stateStr);

Although only the REST information is provided, in another embodiment, the REST information and address (received as described above) are provided by the RIA to the referring page.

Ref. Page Provides REST Info to Browser for Display

In step 268, the address and REST information are provided to the browser by the referring page, and the URL display on the browser is updated to display the address and REST information. In one embodiment, to provide the address and REST information to the browser, the VBScript function sets the value of location.href as shown in the example above. In this embodiment, the referring page appends the address to the REST information received from the RIA, though in other embodiments, the address and REST information are received from the RIA and provided to the browser as received.

The browser will display a URL that includes a web address as well as location and/or variable information. This information may be used, as described above, with reference to steps 228-232 to return the RIA to the same location.

RIA Provides REST Info to Ref. Page Via JavaScript

If the browser is not Microsoft Internet Explorer 264, then the RIA provides 270 the address and REST information to the referring page using a JavaScript function. In one embodiment, the address and REST information can be provided by the RIA to a JavaScript function on the referring page by calling "getURL" in ActionScript and using the "javascript" prefix to indicate that there is script to be run. For example, getURL('javascript:flashPutHref(#'+this.stateStr+'');');

is one way of providing the REST information to the referring page via a JavaScript function if the browser is a non-Internet-Explorer browser. In one embodiment, the REST information is provided to the referring page by the RIA and the referring page appends it to the address as described below. In another embodiment, the RIA provides the address and REST information to the referring page, using the address received as described above.

Ref. Page Provides REST Info to Browser for Display

The referring page then provides the address and REST information to the browser 272. In one embodiment, to provide the REST information to the browser, the JavaScript function sets a new value to "location.href", as shown in line below:

function flashPutHref(href) {location.href=href;}

The browser then displays the address and REST information in the address box of the browser.

As noted, the referring page may append the address information to the REST information received from the RIA and provide the address and REST information to the browser. In another embodiment, the RIA provides both the address and REST information and the referring page receives it and provides it to the browser as received.

RIA Runs

The Rich Internet Application runs 280 in a conventional fashion. The RIA may run using any conventional technique of any conventional program. In one embodiment, if the RIA is a Flash movie, then the movie is displayed as an animation. At any time, the RIA may determine that a new title or new REST information may apply 240, 260. If the RIA determines that a new title applies 240, then the method continues at step 242. If the RIA determines that new REST information applies 260, then the method continues at step 262.

It can be helpful for the URL provided by the referring page to the browser as described above to be URL encoded as described at the web page blooberry.com/indexdot/html/topics/urlencoding.htm. Alternatively, the RIA can avoid the use of non-permitted characters, such as '&' in the REST information.

Forward/Back Button Support

To enable the user to use the forward and back buttons to navigate between the previously-visited points of the RIA identified with different REST information, in one embodiment, the referring page defines an invisible iframe that has a name that can be referenced as described below. An invisible iframe is a frame that will not be displayed by the browser, but acts like part of a web page for all other purposes. For example, the referring page contains: <iframe name="frameBuffer" style="display: none;"></iframe>

Following steps 268 and 272 but before step 280, the RIA sets in process a series of instructions that will cause the browser to load information that includes the rest information into the browser history, so that the REST information is included in the addresses loaded in response to a user using the browser's forward and back buttons. As described above, if forward and back button support is not desired, step 280 follows steps 268 and 272 as illustrated by the dashed lines in the Figure.

Figure 4B:
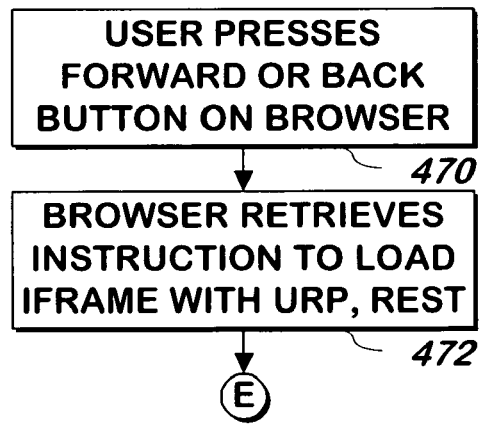
FIG. 4, consisting of FIGS. 4A and 4B, is a flowchart illustrating a method of communicating REST information into the history of a browser and receiving the REST information when the browser's forward and back buttons are used to allow the RIA to jump to a new location, load variables or both, according to one embodiment of the present invention.
Figure 4:
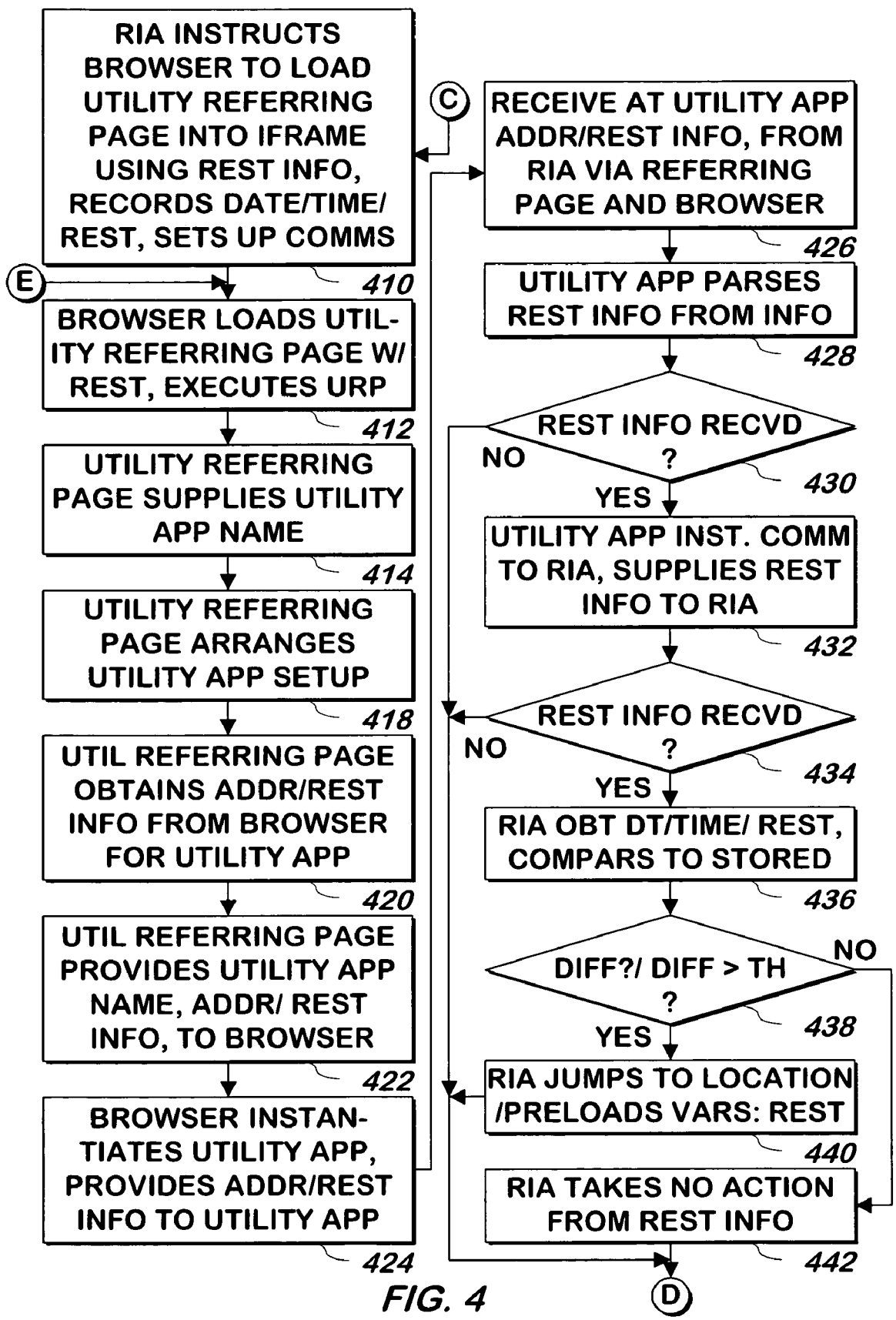

FIG. 4, consisting of FIGS. 4A and 4B, illustrate a method of communicating REST information into the history of a browser and receiving the REST information when the browser's forward and back buttons are used to allow the RIA to jump to a new location, load variables or both, according to one embodiment of the present invention. Referring now to FIG. 4A, to set the series of instructions in process, the RIA instructs the browser to load into the iframe of the referring page a utility referring page from a server, and includes the newly identified REST information 410 as part of the URL it supplies to the browser to load the iframe. In one embodiment, a Flash RIA uses the conventional getURL Actionscript command using the name of the frame and the URL of the utility referring page. As part of the URL of the utility referring page, the RIA includes a delimiter such as '#' and the REST information it identified in the most recently performed step 262. Step 410 includes the RIA retrieving the current date and time from the system clock or another source and storing its value for use as described below. Step 410 may include setting up communications to enable information to be received from the utility application as described below. In one embodiment, a Flash LocalConnection is arranged for this purpose, though other embodiments may employ other means of communications such as sockets and the like.

The browser loads the utility referring page and executes any instructions contained therein 412.

In one embodiment, the utility referring page contains therein instructions that are at least similar or identical to those in the referring page, for example, in the code above, except that the name of the utility application is provided in place of the name of the RIA, and the height and width of the RIA may be specified as a smaller value or zero. Operation of the utility referring page is similar or identical to that of the referring page described above, as will now be briefly described.

The utility referring page supplies the name of the utility application 414, for example by the function call in the line in the utility referring page that is similar to instruction 10, described above. The utility referring page need not obtain the browser type from the browser as is performed in step 216 and so the code performing that function on the referring page need not be duplicated on the utility referring page. The utility referring page arranges 418 for the setup of the utility application in a manner similar to that described above, except that the utility application will have a URL different from that of the RIA. In one embodiment, the utility application is an application that runs under the Flash Player, but is different from the RIA described above. In one embodiment, the utility application performs the operations described below.

The utility referring page obtains 420 the address and REST information from the browser in the manner described above. The utility referring page provides 422 the name of the utility application supplied in step 414, and the address and REST information obtained as described above, to the browser in a manner similar to that described above, except that the browser type is not provided to the browser as part of the Flashvars, and as noted, the utility application will have a different name and/or location from that of the RIA.

The browser instantiates the utility application and provides or makes available the REST information 424 in the same manner as was described above.

The utility application receives 426 the address and any REST information from the browser that had been provided by the RIA via the referring page as described above. The utility application parses 428 any REST information from the address and any REST information it receives, and if REST information is not present 430, the method continues at step 280.

If REST information is present 430, the utility application sets up a communication channel with the RIA and provides the REST information via the communication channel 432 and the method continues at step 434. In one embodiment, to set up communications between two Flash applications, one being at least a part of the utility application and the other being at least a part of the RIA, the conventional Flash Local-Connection capability is used, described at the Web site of Macromedia.com, including macromedia.com/support/flash/action_scripts/local_connection_objects/local_connection_object05.html, although other means of communications, such as sockets and the like may be employed for other types of applications. The present invention may be used with RIAs and utility applications that are not Flash applications.

Steps 434-442 may be performed by the RIA. At step 434, if REST information was not received by the RIA from the utility application over the communication instantiated by the RIA in step 410 as described above, the method continues at step 280. If REST information was received by the RIA from the utility application over the communication instantiated by the RIA in step 410 as described above 434, the RIA obtains the current date and time, for example, from the system clock and compares the current date and time to the date and time, if any, most recently stored as part of step 410. In the case in which the RIA has provided the REST information to the utility application, the difference will not exceed a threshold. If the difference does not exceed the threshold 438, the RIA will not jump to another location or preload variables as a result of the REST information 442.

In another embodiment, at step 436, instead of obtaining the current date and time and comparing to the date and time retrieved in step 410, the REST information received in step 412 is compared with the REST information most recently provided in step 410. In this embodiment, step 410 may include storing the REST information provided. If the REST information from these two sources is similar or the same 438, the method continues at step 442 and otherwise 438, the method continues at step 440. The two pieces of REST information will be the same or similar if the REST information received by the RIA is in response to the RIA loading or reloading the iframe, and thus, the RIA will take no action in response.

Referring now to FIG. 4B (on the same sheet as FIG. 1), at any time, a user may use the browser's forward or back buttons 470. If the utility referring page has been loaded or reloaded as described above, The browser will retrieve the address of the utility referring page and REST information and the name of the iframe 472. The method will continues at step 412 of FIG. 4B. This time, at step 438, the difference between the date and time stored in a previous iteration of step 410 and the date and time obtained in the most recent iteration of step 436 will exceed the threshold. If the difference between the date and time stored and the current date and time exceeds a threshold 438, the RIA jumps to location in the program corresponding to the REST information, preloads variables corresponding to the REST information, or both 440 and the method continues at step 280. The RIA will operate from that location, using those variables, or both.

In the embodiment in which REST information is compared as described above, when the RIA has advanced past the REST information to a point at which new REST information is available, for example, the RIA will jump or load variables in response to the rest information.

System

Figure 3:
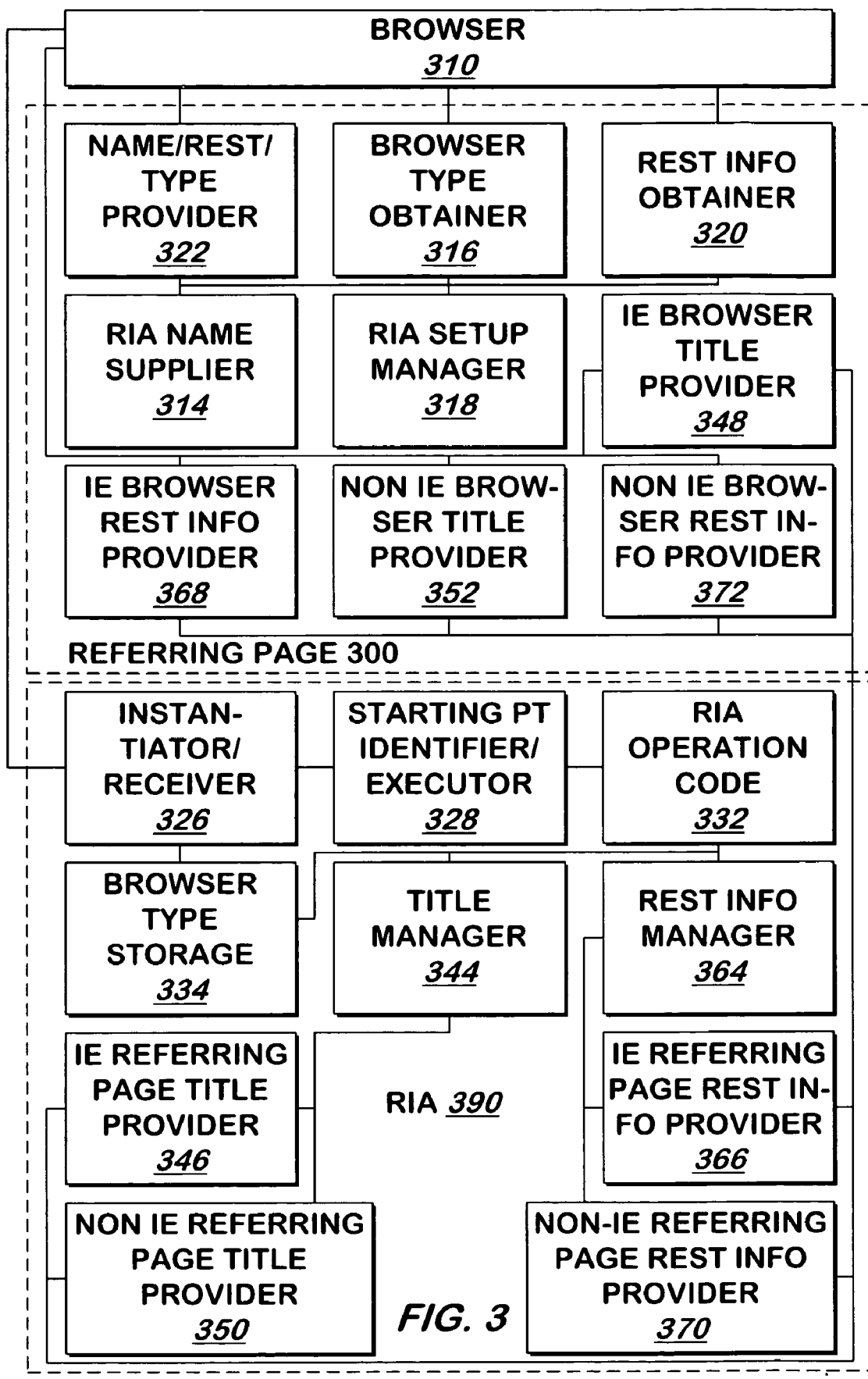
FIG. 3 is a block schematic diagram of a system for communicating REST information and title information between a browser and an RIA according to one embodiment of the present invention.

FIG. 3 is a block schematic diagram of a system for communicating REST and title information between an RIA and a browser according to one embodiment of the present invention. Referring now to FIG. 3, browser 310 includes a conventional browser as described above. When browser 310 receives the address of a referring web page, it displays the title and address of the web page, and signals RIA name supplier 314, browser type obtainer 316, REST info obtainer 320 and RIA setup manager 318, all of which are parts of referring page 300.

When RIA name supplier 314 receives the signal from browser 310, it supplies the name of the RIA to name/REST/type provider 322 as described above.

When browser type obtainer 316 receives the signal from browser 310, browser type obtainer 316 obtains the browser type from browser 310 as described above, and provides it to name/REST/type provider 322.

When RIA setup manager 318 receives the signal from browser 310, RIA setup manager 318 arranges the setup of the RIA in the manner described above and sends the setup information to name/REST/type provider 322.

When REST info obtainer 320 receives the signal from browser 310, REST info obtainer 320 obtains the address and REST information from browser 310 as described above, and sends the REST information to name/REST/type provider 322.

When name/REST/type provider 322 receives the RIA name, browser type, address and REST information and RIA setup information from the different sources described above, it sends the information as a bundle to browser 310, in the manner described above.

When browser 310 receives the RIA name, browser type, address and REST information and the RIA setup information from name/REST/type provider 322, browser 310 uses the RIA name and RIA setup information to identify the RIA 390 and passes REST the information and browser type to instantiator/receiver 326 of the RIA 390.

When instantiator/receiver 326 receives the address and REST information and browser type from the browser 310, it stores the browser type information in browser type storage 334 and signals and provides any address and REST information to starting point identifier/executor 328. When so signaled, starting point identifier/executor 328 determines whether REST information is indeed present. If REST information has not been provided, then starting point identifier/executor 328 begins executing RIA operation code 332 at the default starting point, for example, the beginning. RIA operation code 332 is a conventional rich internet application that executes using a browser, such as an application that runs under a plugin to a browser, such as the conventional Flash Player. If REST information has been provided, starting point identifier/executor 328 identifies the corresponding location in the RIA code 332, as described above, it makes available the address and any REST information to RIA operation code 332, and it begins execution of the RIA operation code 332 at the location it identifies. The RIA may use the REST information to preload the value of variables used by the RIA.

At any time during the operation of RIA operation code 332, the RIA code 332 may identify a new title, address and REST information, or both, to be displayed by the browser. When RIA code 332 identifies a new title or new address and REST information, it sends the new title information to title manager 344 and sends the new address and REST information to REST info manager 364. In one embodiment, the address is the same one received by RIA operation code 332, as described above.

When title manager 344 receives new title information, it determines the browser type specified in browser type storage 334, and sends the title information to either IE referring page title provider 346 or non-IE referring page title provider 350, as described below. If title manager 344 determines that the browser type in browser type storage 334 indicates that the browser is Microsoft Internet Explorer, then title manager sends the title information to IE referring page title provider 346; however if the browser type in browser type storage 334, indicates that the browser is not Microsoft Internet Explorer, then title manager 344 sends the title information to non-IE referring page title provider 350.

When IE referring page title provider 346 receives title information from title manager 344, it sends the title information to IE browser title provider 348 in the manner described above. In one embodiment, IE browser title provider 348 is part of the VBScript function on the referring page 300, as described above, and communication between IE referring page title provider 346 and IE browser title provider 348 is performed in the manner described above.

When IE browser title provider 348 receives title information from IE referring page title provider, it provides the title information to browser 310 in the manner described above, and browser 310 displays the title information in the window title.

When non-IE referring page title provider 350 receives title information from title manager 344, it sends the title information to non-IE browser title provider 348, in the manner described above. In one embodiment, non-IE browser title provider 348 is part of the JavaScript function on the referring page 300, as described above, and communication between non-IE referring page title provider 350 and non-IE browser title provider 348 is performed in the manner described above.

When non-IE browser title provider 348 receives the title information from non-IE referring page title provider 350, it provides the title information to browser 310 in the manner described above, and browser 310 displays the title information in the window title.

In a similar fashion, when RIA operation code 328 identifies new address and REST information, it sends the new address and REST information to REST info manager 364.

When REST information manager 364 receives new address and REST info from RIA operation code 332, it determines the browser type in browser type storage 334, and sends the address and REST information to either IE referring page REST information provider 366 or non-IE referring page REST information provider 370, as described below. (As noted above, REST information manager 364 may receive only the REST information from the RIA, and the referring page REST information provider 366 or 370 will prepend the address to the REST information. If the browser type in browser type storage 334, indicates that the browser is Microsoft Internet Explorer, then REST information manager 364 sends the REST information to IE referring page REST information provider 366; otherwise, REST information manager 344 sends the REST information to non-IE referring page REST information provider 370.

When IE referring page REST information provider 366 receives the address and REST information from REST information manager 364, it sends the REST information to IE browser REST information provider 368 in the manner described above. In one embodiment, IE browser REST information provider 348 is part of the VBScript function on the referring page 300, as described above, and communication between IE referring page REST info provider 346 and IE browser REST information provider 348 is performed in the manner described above.

When IE browser REST information provider 368 receives the address and REST information from IE referring page REST information provider, it provides the address and REST information to browser 310 in the manner described above, and browser 310 displays the address and REST information in the address box of the browser.

When non-IE referring page REST info provider 370 receives the address and REST information from REST information manager 364, it sends the address and REST information to non-IE browser REST information provider 368, in the manner described above. In one embodiment, non-IE browser REST information provider 368 is part of the JavaScript function on the referring page 300, as described above, and communication between non-IE referring page REST information provider 370 and non-IE browser REST information provider 368 is performed in the manner described above.

When non-IE browser REST info provider 368 receives the address and REST information from non-IE referring page REST info provider, it provides the address REST information to browser 310 in the manner described above, and browser 310 displays the REST information in the address bar of the browser.

Starting point identifier/executor 328 continues executing RIA operation code 332, which may update the title and/or REST information on the browser any number of times as described above. In one embodiment, when starting point identifier/executor 328 completes executing the RIA operation code 332 it terminates operation in a conventional manner.

Forward and Back Button Support

Figure 5:
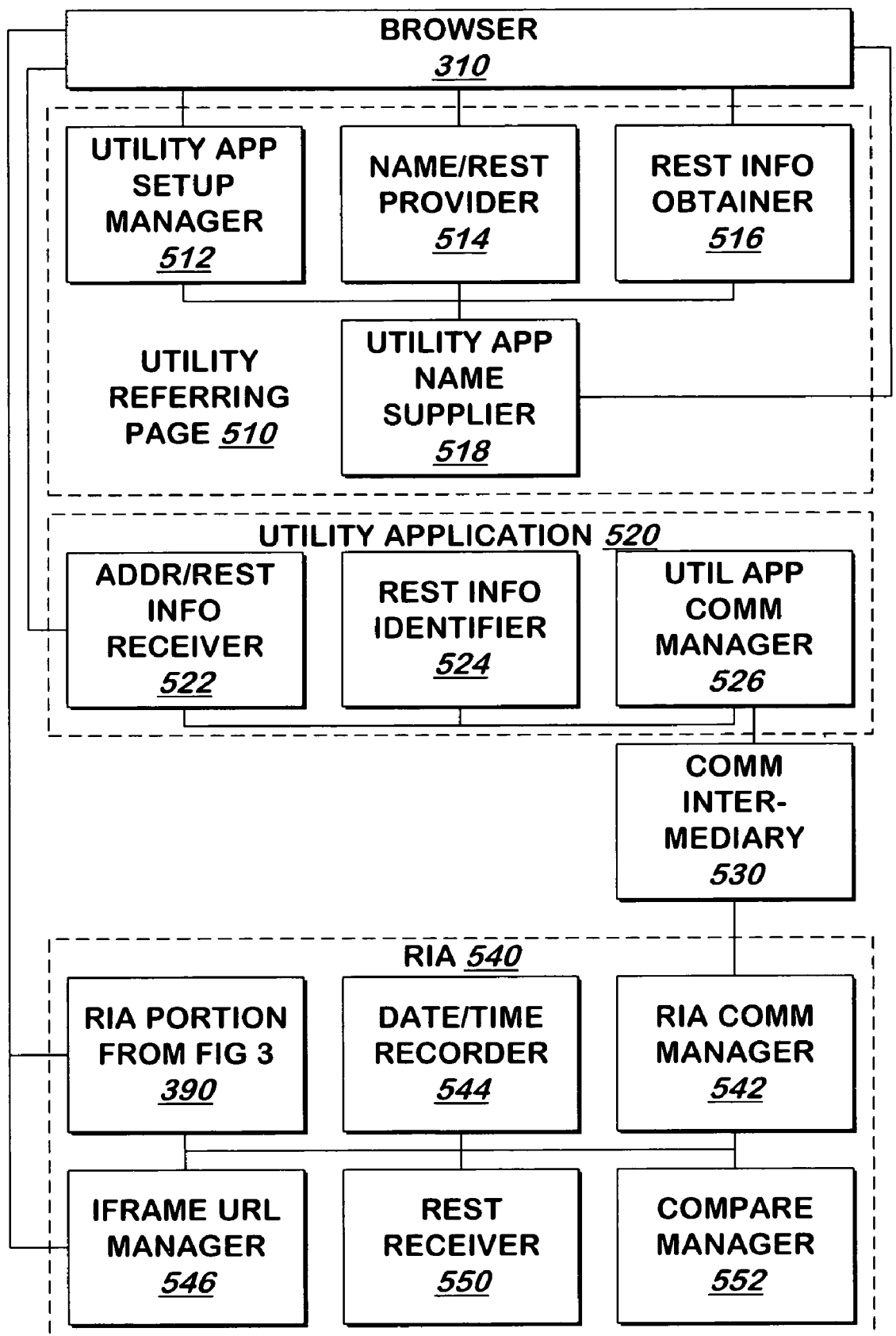
FIG. 5 is a block schematic diagram of the remainder of the system of FIG. 3 for communicating REST information into the history of a browser and receiving the REST information when the browser's forward and back buttons are used to allow the RIA to jump to a new location, load variables or both, according to one embodiment of the present invention.

FIG. 5 is a block schematic diagram of the remainder of the system of FIG. 3 for communicating REST information into the history of a browser and receiving the REST information when the browser's forward and back buttons are used to allow the RIA to jump to a new location, load variables or both, according to one embodiment of the present invention. The entire system of FIG. 3 may be used with that of FIG. 5 to operate as described herein.

Referring now to FIGS. 3 and 5, in the embodiment in which the forward and back button may be used to operate the RIA, when REST information manager 364 receives new address and REST info from RIA operation code 332 it additionally signals date/time recorder 544 and RIA communication manager 542 and provides the REST information it receives to iframe URL manager 546. When it receives the REST information, iframe URL manager directs the browser 310 to run the utility referring page 510 the iframe named as described above. Iframe URL manager 546 is part of RIA 540, which includes the RIA portion from FIG. 3 390 as well as components 542-552 as described herein. When signaled, date/time recorder 544 retrieves the date and time from the system clock (not shown) of the operating system or elsewhere, and internally stores the date and time it receives.

When signaled, RIA communication manager 542 arranges with communication intermediary 528 a communication channel that will allow utility application 520 to send to RIA 540 REST information, for Example, using a Flash local connection as described herein.

When directed as described above, browser 310 signals utility application setup manager 512, utility RIA name supplier 518, and rest information obtainer 516 of utility referring page 510. When so signaled, REST information obtainer 516 obtains the REST information from the browser in a similar manner described above with respect to REST information obtainer 320, and provides the REST information to name/REST provider 514. When so signaled, utility application name supplier 518 supplies the name of the utility application to utility RIA setup manager 512 in a similar manner described above with respect to RIA name supplier 314. When it receives the name of the utility application, utility application setup manager 512 incorporates it into the utility application setup information that is similar to the RIA setup information as described above to produce the utility application setup information as described above and provides such setup information to name/REST provider 514.

When name/REST provider 514 receives the REST information and RIA setup information, it provides it to browser 310 in a similar manner as described above with respect to name/REST/type provider 322. In response, browser 310 signals address/REST information receiver 522 of utility application 520 and provides or makes available to address/REST information receiver 522 the address of the utility referring page and any REST information it received.

When so signaled, address/REST information receiver 522 provides the address and any REST information it receives to REST information identifier 524, which identifies if any REST information has been received as described above. If so, it provides the REST information to utility application communication manager 526, which arranges communications with, and provides the REST information to, RIA communication manager 540. In one embodiment, utility application communication manager 526 and RIA communication manager 540 communicate via a communication intermediary 530, such as the operating system, or the Flash player plug-in to commercially available browsers, the Flash player being commercially available from Macromedia, Inc., of San Francisco Calif. or both. Communication intermediary 530 provides the communications from utility application communication manager 526 to RIA communication manager 540 as described herein.

When it receives the REST information, RIA communication manager 542 provides it to REST information receiver 550. When it receives the REST information, REST information receiver 550 signals compare manager 552.

When signaled, in one embodiment, compare manager 552 retrieves from the system clock (not shown) or elsewhere, the current date and time. Additionally, compare manager 552 retrieves from date/time recorder 544 the last recorded date and time. Compare manager 552 subtracts the last recorded date and time from the current date and time and compares the result to a threshold. The threshold is selected to be slightly higher than the estimated amount of time it takes between recording the time by date/time recorder 544 and retrieving the time by compare manager 552 when both are performed in response to one new REST information being available. A threshold of approximately 0.5 seconds may be used in one embodiment, though other thresholds may be used in other embodiments. If compare manager 552 retrieves the current date and time after the user has used the forward or back buttons, the threshold should ordinarily be exceeded.

If compare manager 552 determines that the difference does not exceed the threshold, it will not take any further action that would cause the RIA operation code to operate differently in response to the REST information received, for example, by jumping to a different location that would cause the screen to be displayed differently or variables to be loaded, each in response to the REST information received by REST receiver 550. If the difference does exceed the threshold, compare manager 552 signals REST receiver 550.

In another embodiment, compare manager 552 does not operate as described above. Instead, when REST information receiver 550 receives the REST information, REST information receiver 550 signals compare manager 552 with the REST information it receives.

When signaled, compare manager 552 retrieves from iframe URL manager 546 the REST information that iframe URL manager 546 most recently provided and iframe URL manager 546 provides the REST information it most recently received as described above. If the REST information retrieved from iframe URL manager 546 is the same or similar as the REST information received from received from REST information receiver 550, compare manager 552 will not take any further action that would cause the RIA operation code to operate differently in response to the REST information received, for example, by jumping to a different location that would cause the screen to be displayed differently or variables to be loaded, each in response to the REST information received by REST receiver 550. If the REST information received from each of the two sources 546, 550, is different or significantly different, compare manager 552 signals REST receiver 550.

When signaled, REST receiver 550 provides the REST information to starting point identifier/executor 328. When it receives the REST information, starting point identifier/executor 328 identifies the location in the RIA operation code 332 corresponding to the REST information and causes the RIA operation code 332 to begin operating at that location, if different from the current location from which the RIA is operating. Starting point identifier/executor 328 then provides or makes available to the RIA operation code 332 any variables corresponding to the REST information it receives. The RIA will then operate from that point using any such variables.

Although the iframe is described herein as being loaded after the browser is provided the state information, in one embodiment, the browser is provided the state information after the iframe is loaded. In such embodiment, the steps of FIG. 4 may be inserted between steps 262 and 264, for example, and step 280 follows steps 268 and 272, and REST information manager 364 signals date/time recorder 544 and RIA communication manager 542 and provides the REST information it receives to iframe URL manager 546 before providing the address and REST information it receives to either referring page REST information provider 366, or 370, as opposed to the opposite order.

Any of the REST information provided by itself as described herein may be provided with the address in other embodiments of the present invention.

What is claimed is:

1. A method of communicating state information between an application and a browser, comprising:
   at an application that runs under the browser, providing the state information to a referring web page that caused the browser to run the application;
   at the referring web page, receiving the state information and providing the state information to the browser in a manner that will cause the browser to display the state information in a text box in which an address of web pages is displayed; and
   providing the state information from the application to the browser in a manner that will cause the browser to record the state information to be provided in response to a user's use of the browser's forward or back buttons.

2. The method of claim 1, additionally comprising:
   at the application, providing title information to the referring web page; and
   at the referring web page, receiving the title information and providing the title information in a manner that will cause the browser to display the title information in an area of the browser in which titles of web pages are displayed.

3. The method of claim 1, wherein state information is provided from the application to the browser by directing the browser to load a utility referring page via a command that includes the state information.

4. The method of claim 3:
   wherein the utility referring web page references a utility application; and additionally comprising:
   providing, by the utility referring web page to the utility application, state information from that used to load the utility referring web page.

5. The method of claim 4, additionally comprising providing by the utility application to the application, at least some of the state information received from the utility referring page.

6. The method of claim 5 additionally comprising operating the application responsive to the state information received.

7. The method of claim 6, wherein the operating step comprises jumping to a location in the application responsive to the state information.

8. The method of claim 6, wherein the operating step comprises changing a value of the application responsive to the state information.

9. The method of claim 6, wherein the operating step is responsive to at least one time.

10. The method of claim 6, wherein the operating step is responsive to a difference between the state information provided from the application to the browser and the state information provided by the utility application to the application.

11. A system for communicating state information between an application and a browser, comprising:
    an application that runs under the browser, the application for providing at an output the state information to a referring web page that caused the browser to run the application, and providing at the application output the state information from the application to the browser in a manner that will cause the browser to record the state information to be provided in response to a user's use of the browser's forward or back buttons; and
    a referring web page having an input coupled to the application output for receiving the state information, the referring web page for providing at an output the state information to the browser, in a manner that will cause the browser to display the state information in a text box in which an address of web pages is displayed.

12. The system of claim 11, wherein:
    the application is additionally for providing at the application output title information to the referring web page; and
    the referring web page additionally receives the title information at the referring web page input and provides the title information at the referring web page output in a manner that will cause the browser to display the title information in an area of the browser in which titles of web pages are displayed.

13. The system of claim 11, wherein the application provides the state information to the browser by directing the browser to load a utility referring page via a command that includes the state information.

14. The system of claim 13:
    wherein the utility referring web page comprises an output coupled to an input of a utility application; and
    the utility referring web page is for providing at the utility referring web page output to the utility application, state information from that used to load the utility referring web page.

15. The system of claim 14, wherein the utility application is for providing to the application via an output coupled to a utility application input of the application, at least some of the state information received from the utility referring page.

16. The system of claim 15 wherein the application operates responsive to the state information received.

17. The system of claim 16, wherein the application operates by jumping to a location in the application responsive to the state information.

18. The system of claim 16, wherein the operating operates by changing a value of the application responsive to the state information.

19. The system of claim 16, wherein the application operates additionally responsive to at least one time.

20. The system of claim 16, wherein application operates additionally responsive to a difference between the state information provided from the application to the browser and the state information received from the utility application.

21. A computer program product comprising a computer useable medium having computer readable program code embodied therein for communicating state information between an application and a browser, the computer program product comprising computer readable program code devices configured to cause a computer system to:
    at an application that runs under the browser, provide the state information to a referring web page that caused the browser to run the application;
    at the referring web page, receive the state information and provide the state information to the browser in a manner that will cause the browser to display the state information in a text box in which an address of web pages is displayed; and provide the state information from the application to the browser in a manner that will cause the browser to record the state information to be provided in response to a user's use of the browser's forward or back buttons.

22. The computer program product of claim 21, additionally comprising computer readable program code devices configured to cause the computer system to:

at the application, provide title information to the referring web page; and at the referring web page, receive the title information and providing the title information in a manner that will cause the browser to display the title information in an area of the browser in which titles of web pages are displayed.

23. The computer program product of claim 21, wherein state information is provided from the application to the browser by directing the browser to load a utility referring page via a command that includes the state information.

24. The computer program product of claim 23:

wherein the utility referring web page references a utility application; and additionally comprising computer readable program code devices configured to cause the computer system to:

provide, by the utility referring web page to the utility application, state information from that used to load the utility referring web page.

25. The computer program product of claim 24, additionally comprising computer readable program code devices configured to cause the computer system to provide, by the utility application to the application, at least some of the state information received from the utility referring page.

26. The computer program product of claim 25 additionally comprising computer readable program code devices configured to cause the computer system to operate the application responsive to the state information received.

27. The computer program product of claim 26, wherein the computer readable program code devices configured to cause the computer system to operate comprise computer readable program code devices configured to cause the computer system to jump to a location in the application responsive to the state information.

28. The computer program product of claim 26, wherein the computer readable program code devices configured to cause the computer system to operate comprise computer readable program code devices configured to cause the computer system to change a value of the application responsive to the state information.

29. The computer program product of claim 26, wherein the computer readable program code devices configured to cause the computer system to operate are responsive to at least one time.

30. The computer program product of claim 26, wherein the computer readable program code devices configured to cause the computer system to operate are responsive to a difference between the state information provided from the application to the browser and the state information provided by the utility application to the application.

* * * * *